United States Patent
Abolhassani et al.

(10) Patent No.: US 8,129,853 B2
(45) Date of Patent: Mar. 6, 2012

(54) POWER CONVERTER FOR USE WITH WIND GENERATOR

(75) Inventors: Mehdi Abolhassani, Austin, TX (US); Thomas Keister, Georgetown, TX (US); Haran Karmaker, Round Rock, TX (US); Ryan Edwards, Round Rock, TX (US); Enrique Ledezma, Austin, TX (US); Alex Skorcz, Cedar Park, TX (US)

(73) Assignee: TECO-Westinghouse Motor Company, Round Rock, TX (US)

( * ) Notice: Subject to any disclaimer, the term of this patent is extended or adjusted under 35 U.S.C. 154(b) by 0 days.

(21) Appl. No.: 12/827,836

(22) Filed: Jun. 30, 2010

(65) Prior Publication Data

US 2011/0012364 A1    Jan. 20, 2011

Related U.S. Application Data

(62) Division of application No. 12/494,668, filed on Jun. 30, 2009.

(51) Int. Cl.
*H02K 6/00* (2006.01)

(52) U.S. Cl. .............. 290/44; 290/54; 290/55

(58) Field of Classification Search .......... 290/44, 290/545, 55; 310/176
See application file for complete search history.

(56) References Cited

U.S. PATENT DOCUMENTS

| | | | |
|---|---|---|---|
| 5,625,545 A | 4/1997 | Hammond | |
| 6,229,722 B1 | 5/2001 | Ichikawa et al. | |
| 6,404,655 B1 | 6/2002 | Welches | |
| 6,653,744 B2 | 11/2003 | Stricker | |
| 6,680,856 B2 | 1/2004 | Schreiber | |
| 7,095,128 B2 * | 8/2006 | Canini et al. | 290/44 |
| 7,271,500 B1 * | 9/2007 | Kimura et al. | 290/52 |
| 7,283,537 B2 * | 10/2007 | Kametani | 370/401 |
| 7,324,359 B2 | 1/2008 | Schreiber | |
| 7,627,842 B1 * | 12/2009 | Khoo et al. | 716/5 |
| 2005/0151520 A1 | 7/2005 | Schreiber | |
| 2008/0007973 A1 | 1/2008 | Schreiber | |

FOREIGN PATENT DOCUMENTS

| | | |
|---|---|---|
| DE | 10114075 B4 | 8/2005 |
| DE | 102004001478 A1 | 8/2005 |
| EP | 0 635 639 A1 | 1/1995 |
| EP | 1244203 A2 | 12/2001 |
| JP | 2002295686 | 10/2005 |
| JP | 20062466553 | 9/2006 |
| KR | 20090039393 | 4/2009 |

OTHER PUBLICATIONS

Dr. Keith Corzine, "Operation and Design of Multilevel Inverters," Developed for the Office of Naval Research, Dec. 2003, Revised Jun. 2005, pp. 1-79.

U.S. Appl. No. 12/284,849, filed Sep. 24, 2008 entitled, "Modular Multi-Pulse Transformer Rectifier for Use in Symmetric Multi-Level Power Converter," by Mehdi Abolhassani, et al.

(Continued)

*Primary Examiner* — Tulsidas C Patel
*Assistant Examiner* — Iraj A Mohandesi
(74) *Attorney, Agent, or Firm* — Trop, Pruner & Hu, P.C.

(57) ABSTRACT

In one embodiment, the present invention includes a turbine to generate mechanical energy from kinetic energy, a generator coupled to the turbine to receive the mechanical energy and to output multiple isolated supply powers, and multiple power stages each coupled to the generator. Each of the power stages may receive at least one of the isolated supply powers.

19 Claims, 15 Drawing Sheets

OTHER PUBLICATIONS

U.S. Appl. No. 12/317,957, filed Dec. 31, 2008 entitled, "Partial Regeneration in a Multi-Level Power Inverter," by Mehdi Abolhassani, et al.

Dr. Shreiber, "Medium Voltage Windmill Converters," Jul. 8, 2008, pp. 1-27.

U.S. Patent and Trademark Office, Office Action mailed Nov. 8, 2010 and Reply filed Feb. 8, 2011 in U.S. Appl. No. 12/827,797.

Patent Cooperation Treaty, Notification of Transmittal of the International Search Report and the Written Opinion of the International Search Authority mailed Feb. 8, 2011 in International application No. PCT/US2010/039920.

* cited by examiner

US 8,129,853 B2

POWER CONVERTER FOR USE WITH WIND GENERATOR

This application is a divisional of U.S. patent application Ser. No. 12/494,668 filed Jun. 30, 2009 entitled "Power Converter For Use With Wind Generator," the content of which is hereby incorporated by reference.

BACKGROUND

In recent years, researchers and scientists have focused on the economical utilization of wind energy on a large scale. Improvement in design of turbines and increasing use of power electronics converters for VAR compensation and/or frequency conversion has given a boost to this industry. In the area of wind and other power generation systems where the input resource power varies considerably, variable-speed generation (VSG) is more attractive than fixed speed systems. In these systems, a maximum power point tracker adjusts a system quantity (such as the rotational speed in the case of wind turbines) to maximize turbine power output. The maximum power point tracking controller and associated power electronics converters set the operating point of the generator to capture the maximum power of fluctuating wind energy.

To maximize their return on investment, developers are aggressively pursuing building larger and larger wind plants. In areas where wind resources support such development, wind plants with total power ratings in excess of 200 MW are becoming the norm. Larger wind plants are designed with a mixture of overhead and underground collector circuits having feeder circuits with individual feeder length exceeding 10 miles in some cases. The plant may also include a collector/interconnect substation, and in some cases a transmission line from the collector substation to the interconnect substation, as well as a separate interconnect substation. The distance from the collector substation to the interconnect substation ranges from several miles to tens of miles, depending on the routing of existing transmission lines and the point of interconnect. The majority of installed wind plants in the US have 34.5 kV collector circuits since in North America most of the medium-voltage infrastructure is based on 35-kV class equipment.

As the penetration and size of wind plants increase, their impact on transmission grids requires a more thorough analysis and understanding. One demanding issue with wind farms is the power quality and stability of the grid. With restructuring of the electric power industry, rules and regulations tend to impact the wind industry through Federal Energy Regulatory Commission (FERC) actions. FERC Orders 661 and 661A address the need for wind plants to support power system voltage by requiring new wind generators to have the capability of fault-ride through and also to control their reactive power within the 0.95 leading to 0.95 lagging range. In addition to the continuing trend to variable speed operation, wind farms can be operated as peak power plants (onshore and offshore). This calls for better control and more enhanced power electronics converter solutions.

For turbine ratings up to around 2 MW, a converter-less structure has resulted in a simple, effective system. High performance turbines have been built with variable speed systems, either using doubly-fed induction generators with a small converter or gearless systems with full-scale converters. Low-voltage technology has been applied successfully at all power levels. At converter power levels in excess of around 500 kVA, a parallel connection of converter modules is typically used to fulfill the technical requirements. However, low voltage wind generators are associated with high connection costs since the effective current that loads the connections between a nacelle (which is a structure present at a top of a wind tower, and which can be 100's of feet in the air) and tower bottom is very high. In a 690 V system a phase current of 1700 A is reached at about 2 MW. This requires a parallel connection of multiple cables per phase and a substantial voltage drop. This disadvantage can be mitigated by placing the electrical conversion system, including the transformer into the nacelle.

However, the structure to support the nacelle weight introduces extremely higher costs. Besides, due to the necessity to connect low-voltage converter modules in parallel, the space needed by the converters in the nacelle increases roughly in proportion to its power. The nacelle dimensions and weight increase considerably and complicate the mechanical stability and the logistics during turbine erection. Thus a need exists for improved power conversion in power generation systems.

SUMMARY OF THE INVENTION

One implementation of the present invention is directed to a system that includes a turbine to generate mechanical energy from kinetic energy, a generator coupled to the turbine to receive the mechanical energy to output multiple isolated supply powers, and multiple power stages each coupled to the generator. Each of the power stages may receive at least one of the isolated supply powers. Further, different subsets of the power stages can be coupled to different phase output lines. In one implementation, the generator can provide $P \cdot n \cdot m$ output connections for the isolated supply powers, where P is the number of phase output lines, n is the number of power stages coupled to one phase output line, and m is the number of phases received by one of the power stages. Similarly, the generator may include N coils, where N equals or is greater than $P \cdot n \cdot (k \cdot m)$, where P is the number of phase output lines, n is the number of power stages coupled to a phase output line, k is the number of coils coupled together to form a phase of an isolated supply power, and m is the number of phases received by one of the power stages.

Another aspect of the present invention is directed to a generator that can provide isolated power outputs directly to multiple power stages of a power converter. The generator includes a rotor and a stator. The stator has slots each having at least one coil wrapped there around, and the generator can provide up to S isolated power outputs, where S is at least equal to $P \cdot n$, where P is the number of phase output lines of the converter and n is the number of power stages coupled in series to one phase output line.

Yet another aspect of the present invention is directed to a wind energy conversion system such as a wind farm that includes wind turbines, generators and a power converter. The generators are each coupled to one of the wind turbines and output multiple isolated supply powers to power stages of the power converter. Different subsets of the power stages are coupled to different phase output lines, which can in turn be directly connected to a collector circuit or a utility grid.

DETAILED DESCRIPTION

Embodiments provide a voltage conversion system that can be used in connection with power generation systems such as wind energy conversion systems. In particular, a multi-level power converter may be provided that results in significant weight, size and cost reduction in installed equipments in a nacelle. Embodiments can further be used in realizing a wind energy conversion system without the need for a transformer, either at an input or output of the converter. In this way a system can connect directly to a collector circuit without needing a step-up transformer, while meeting the power quality requirements specified by the IEEE 519 standard and fault-ride through and reactive power control dictated by FERC orders 661 and 661A. Besides, a power electronics converter in accordance with an embodiment of the present invention can set the wind energy conversion system to capture the maximum power of fluctuating wind energy.

Embodiments can be applied to offshore or onshore standalone wind turbines or a wind plant that can be connected directly to a collector circuit. Other embodiments may be used with other power generation systems such as hydrodynamic, or other fluid-activated turbine. A modular multi-level converter concept can be easily expanded to be connected to different collector circuits without using a step-up transformer. In one embodiment, a medium to high voltage generator (e.g., a 3 MW generator, 34.5 kV) with multiple sets of isolated m-phase windings can be used. Each set of isolated m phase windings supplies power to a corresponding power cell which may be a low voltage or medium voltage power cell. As used herein, the term "low voltage" or "LV" is used to denote voltages of 1000 volts and below, the term "medium voltage" or "MV" is used to denote voltage between approximately 1000 and 35000 volts, and the term "high voltage" or "HV" is used to denote voltages over this level.

Figure 1:
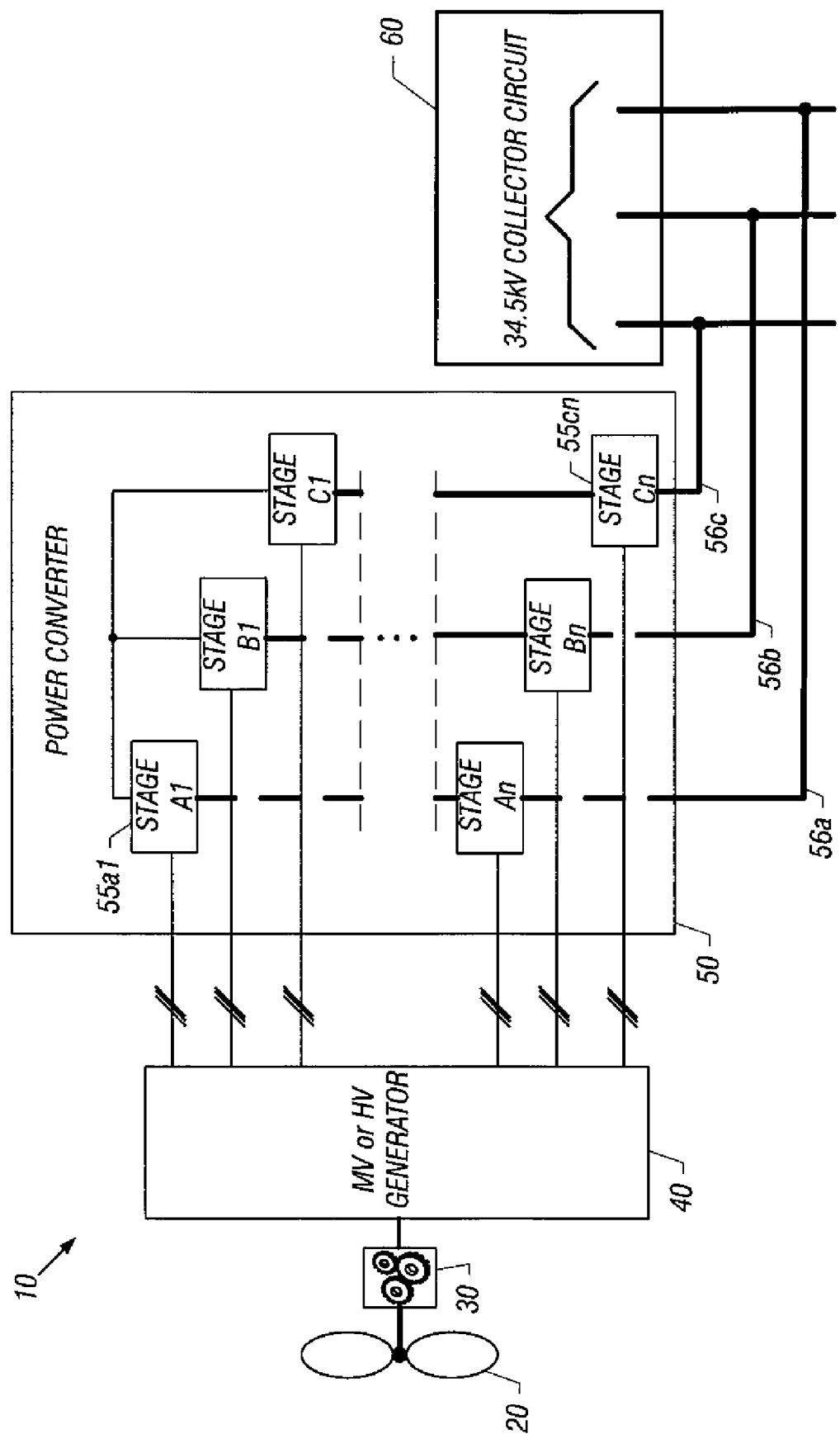
FIG. 1 is a block diagram of a multi-level wind energy conversion system in accordance with one embodiment of the present invention.

FIG. 1 is a block diagram of a multi-level wind energy conversion system in accordance with one embodiment of the present invention. As seen in FIG. 1, an energy conversion system 10 includes a turbine 20 (such as a wind turbine) that converts kinetic energy into mechanical energy and is in turn coupled to a gear box 30 which, as will be described below may be a multi-output gear box. However, in other embodiments, the need for a gearbox can be avoided, and a turbine can directly connect to a generator. Gear box 30 in turn is coupled to a generator 40 which may be a medium to high voltage generator to convert the mechanical energy into electrical energy. In the embodiment of FIG. 1, the turbine may be adapted on a tower, and the gear box and generator and a power converter may be adapted within a nacelle coupled to the turbine. In some implementations, a single module may house both a generator and power converter. However, the need for further components within the nacelle can be avoided, enabling use of a smaller and lighter nacelle, easing manufacturing and installation costs.

As seen in FIG. 1, multiple independent and isolated outputs of m-phases (3-phases in the embodiment of FIG. 1) may be provided from generator 40. Each of these outputs is provided directly to a corresponding one of power stages $55_{a1}$-$55_{cn}$ of a power converter 50. Generally, n (n≧2) number of power stages are connected in series to form one phase of supplied power. As used herein a "power stage" includes one or more power cells in parallel. As used herein, a "power cell" includes an independent power converter (which may be an active front end or a passive rectifier), DC bus, and an inverter. While in some embodiments, a single power cell may be present in a stage, in many implementations two or more power cells may be coupled in parallel to receive isolated power from the generator. In this topology lower voltage power cells of the power stages can be connected in series to generate higher voltage and power. The number of power stages in series depends on required voltage for connectivity to a grid. For example, to connect to a 4160V grid, three 740V power stages are connected in series. In a higher grid such as 34.5 kV grids, higher voltage power stages, e.g., 1500V power stages may be used. As described above, power stages are built up one or more power cells in parallel. Power cells can be formed of two level H-bridges or any different kind of multi-level inverter. In different implementations, each power stage may be of the same voltage level, or an asymmetric topology may be present in which one or more levels of the stages are at different voltages.

In the implementation shown in FIG. 1, one power cell per power stage has been used. However, for providing higher currents, a plurality of power cells can be paralleled to form one power stage. In FIG. 1 power converter 50 may be a 3-phase converter having 3 phase output lines $56_a$-$56_c$, each of which is composed of a series coupling of multiple power stages 55. In turn, each phase output line 56 may be coupled to a collector circuit 60, which in one embodiment may be a 34.5 kV collector circuit. Note that the connections between generator 40 and power stages 55 of power converter 50 may be direct connections, without the need for an input transformer to provide for isolation. Note while shown as a direct coupling, in some implementations a fuse or other protection mechanism may be present in the lines connecting generator 40 and power generator 50. However, this is still a direct connection as there is no need for an input transformer between generator and converter to provide power isolation. Furthermore, the outputs on phase output lines 56 may be provided directly to collector circuit 60 without the need for an output transformer to provide a step-up function. While shown with this particular implementation in the embodiment of FIG. 1, the scope of the present invention is not limited in this regard.

Figure 1A:
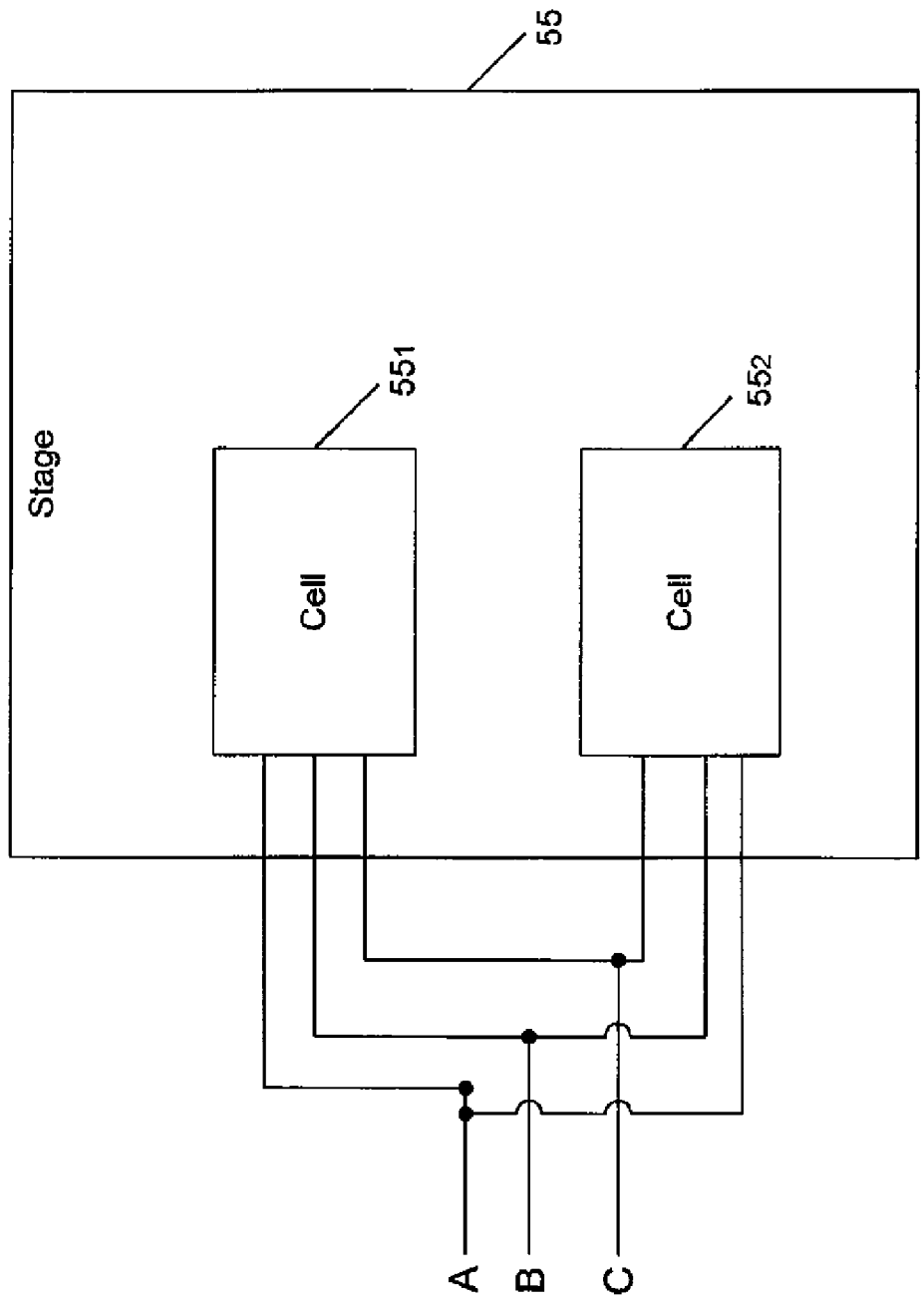
FIG. 1A shows a block diagram of parallel connection of power cells within a stage in accordance with one embodiment of the present invention.

FIG. 1A shows a block diagram of parallel connection of power cells within a stage in accordance with one embodiment of the present invention. As shown in FIG. 1A, power stage 55 includes two power cells 55$_1$ and 55$_2$ coupled in parallel to receive 3-phase isolated power inputs which may be received, e.g., directly from a generator in accordance with an embodiment of the present invention. While shown with only two cells coupled in parallel, it is to be understood that in various implementations more than two cells may be coupled in parallel. Furthermore it is contemplated that in some implementations a power stage may include a single power cell.

Figure 2:
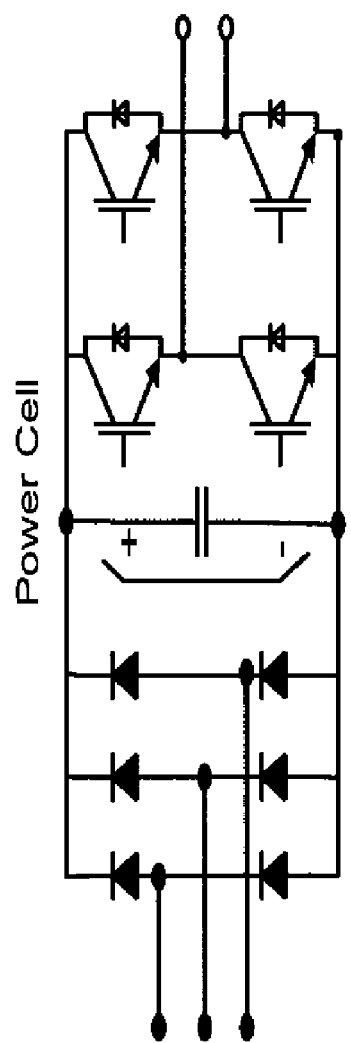
FIG. 2 is an example of a diode front-end power cell in accordance with one embodiment of the present invention.

An example of a diode front-end power cell is depicted in FIG. 2. For convenience, power cells are enumerated herein with number 55, the same as the stages. However, it is to be understood that these terms are not synonymous, as a given stage may include more than one power cell. As seen in FIG. 2, each power cell 55 includes a multi-phase diode rectifier 110 (e.g., three-phase), DC bus 120 and a single-phase inverter 130 (e.g., an H-bridge inverter) which can be formed of semiconductor switching devices such as IGBTs. Of course, other components such as local controllers and so forth may also be present in the power cells. While shown with this particular implementation of power cells in the embodiment of FIG. 2, the scope of the present invention is not limited in this regard and these power cells can be replaced with any different kind multi-level inverter.

Figure 3:
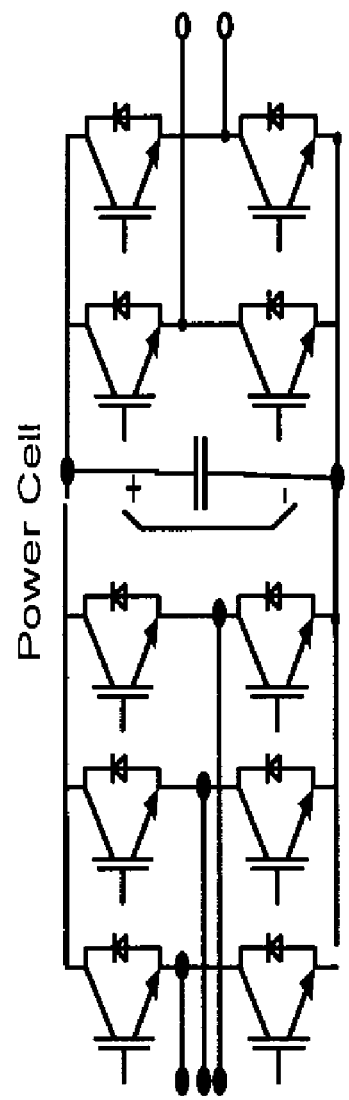
FIG. 3 is an example of a multi-phase active-front end power cell in accordance with one embodiment of the present invention.

In other implementations, a diode front-end rectifier can be replaced by a multi-phase active-front end for enabling the power converter for speed control of the generator to set the wind turbine to capture the maximum power of fluctuating wind power. An example of a multi-phase active-front end power cell 55' is shown in FIG. 3. As seen in FIG. 3, instead of rectifier 110 as present in the embodiment of FIG. 2, power cell 55' of FIG. 3 includes a three-phase active front end 105 that includes a plurality of switching devices, e.g., power IGBTs. These switching devices, as well as switching devices of H-bridge 130 may be controlled via a local cell controller which in turn may be controlled by a master controller of the power converter. While shown with this particular implementation in the embodiment of FIG. 3, the scope of the present invention is not limited in this regard.

Each power stage 55 is supplied from isolated and independent 3-phase windings of generator 40. Generally, generators are built up of several coils that are laid down in stator slots. In a conventional design, coils are connected in series or parallel depending on voltage and power capabilities of the generator to form multi-phases, e.g., a three-phase generator. However, in embodiments of the present invention independent coils of the generator can supply power to each power stage that is electrically isolated from other power stages. If the number of power stages per phase coupled on the phase output lines is equal to n, n sets of m-phase power supplies are needed to form one phase output line of the power converter. Hence, if one generator is used to supply power to the power stages, 3 n sets of m-phase coils are required. However, it is possible to configure more coils in series or parallel to make a set of m-phase windings.

In one embodiment, the total number of generator coils for a standalone wind turbine is calculated as:

$$N = P \cdot n \cdot (k \cdot m) \quad \text{[EQ. 1]}$$

where N is the total number of generator coils;
P is the number of phase output lines;
n is the number of power stages per phase output line of the power converter;
k is the total number of coils in series or parallel to form each phase of m phase power supply,
i.e., an isolated supply power to the power stages;
and m is the number of phases received by the front-end of a power stage.

In some implementations a generator can provide up to S isolated power outputs where S equals or is greater than P·n where P is the number of phase output lines, and n is number of power stages coupled to one phase output line Thus the embodiment shown in FIG. 1 stands in contrast to a conventional drive converter system in which a large number of isolated voltage sources are required to supply power cells. This is typically done using a multi-winding isolation transformer to supply power to the power cells. However, this makes the wind energy conversion system heavy and expensive. In contrast, embodiments can use a multi-winding generator to supply isolated power directly to the power stages of the drive system. In different implementations, a variety of distributed variable speed control algorithms for the generator can further be used to enable maximum power tracking for the wind turbine.

Embodiments may thus transform the way that wind plants are developed and connected to a utility to realize higher levels of reliability, cost effectiveness, and power quality. Technologies in accordance with an embodiment of the present invention can ease the installation, energy collection and transmission of offshore and onshore wind plants by significant weight reduction of the installed equipment in nacelles. Further, such technologies allow a turbine or other device to connect to a generator, utility grid, or collector circuit without using a step-up transformer. By reducing counts and complexity of a tower, logistics and foundation (as well as eliminating a step-up transformer), the cost of per kWh of wind energy is significantly reduced.

Further, by using stacked power stage modules, the voltage and power capability of a wind energy conversion system is expandable to multi-MW levels and voltages of 34.5 kV or more. Besides using a multi-level converter implementations can enable great power quality. With the appropriate design of the generator winding, the machine can produce multi-sets of isolated AC voltages for a cascaded inverter without the need for an isolation transformer or other power converters. Most grid codes now require that wind power plants assist the grid in maintaining or regulating the system voltage. Wind power plants are starting to be required to assist the grid in maintaining or regulating the system frequency as well. By taking advantage of redundancy in modulation techniques provided by embodiments of the present invention, dictated grid codes such as ride-through requirements can be met.

Figure 4:
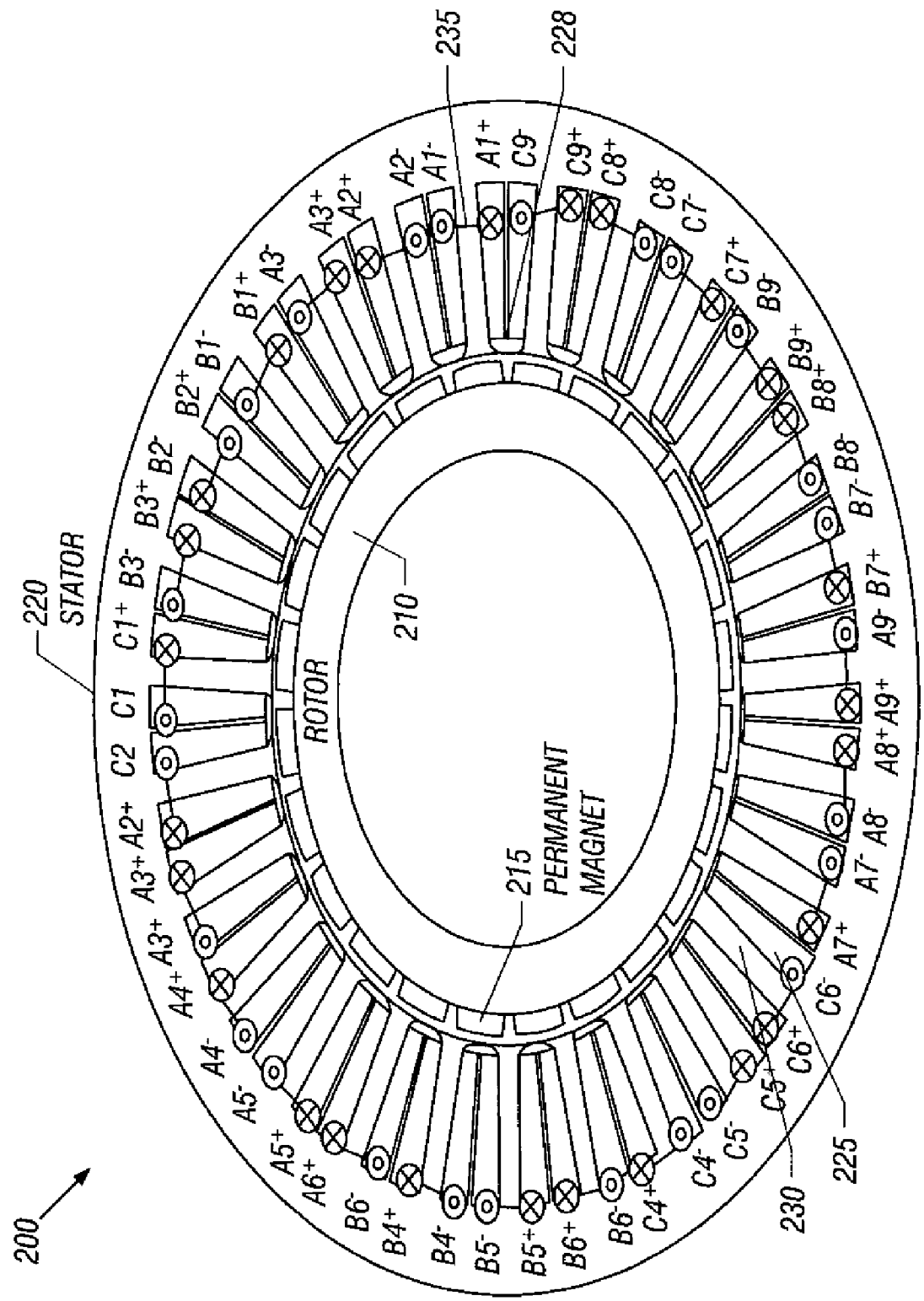
FIG. 4 is a cross-section view of an exemplary three-phase permanent magnet generator in accordance with one embodiment of the present invention.

In the case of a wind farm, a multi-phase generator can supply one or more power stages such that the multi-level power converter can be used to generate higher voltages and cleaner power. As seen in FIG. 4, generator 200 includes a rotor 210 and a stator 220 having a set of permanent magnets 215 coupled therebetween.

Stator 220, which may be formed of an iron core includes a plurality of slots 225 (only one of which is enumerated for ease of illustration in FIG. 4) having interspersed teeth 230 coupled between the slots. Each slot 225 has windings, e.g., copper windings, of one or more coils adapted therein. In the implementation shown in FIG. 4, 27 such slots may be provided, each of which includes a slot liner 228, which provides isolation between two coils present in each slot. Using connections between these windings in accordance with an embodiment of the present invention, a large number of isolated power supplies can be supplied to the phases of the power stages. In this example, generator 200 has concentrated windings around each tooth. There are 27 independent coils in this design. These 27 coils can form 9 sets (1-9) of isolated 3-phase (A-C) power supplies to be provided to a power converter. That is, due to the selective connections made between the coils of the generator, 27 independent voltages can be provided to a power converter. This stands in contrast to a conventional coupling of coils, where for the implementation shown in FIG. 4, only a single set of isolated three-phase power could be provided.

With further reference to FIG. 4, note that in this embodiment, each coil is isolated from all other coils, rather than providing a large number of coils coupled together. For example, as seen in FIG. 4, slots $A1^+$ and $A1^-$ have a coil 235 (A1) wrapped between the slots. However, this coil 235 that wraps around these two slots does not couple to any further coils. Note that while only a single turn of this coil is shown for ease of illustration, the entire width of the slot may be taken up with the coil. This isolated coil present in slots $A1^+$ and $A1^-$ (can be denoted as coil A1) and coil present in slots $B1^+$ and $B1^-$ (can be denoted as coil B1) and coil present in slots $C1^+$ and $C1^-$ (can be denoted as coil C1) can be connected in a star connection and provide an isolated three phase power via a direct connection to a power stage of a power converter. Note that the terminology $A1^+$ and $A1^-$ refers to an isolated coil having two ends, namely a positive end and a negative end. For example in a star connection, the negative side of coils A1, B1 and C1 can be connected together and positive sides are connected to inputs of power stages (power cells). In contrast, in the conventional way of connection of coils in a generator having 27 slots only one 3-phase output is provided.

Figure 5:
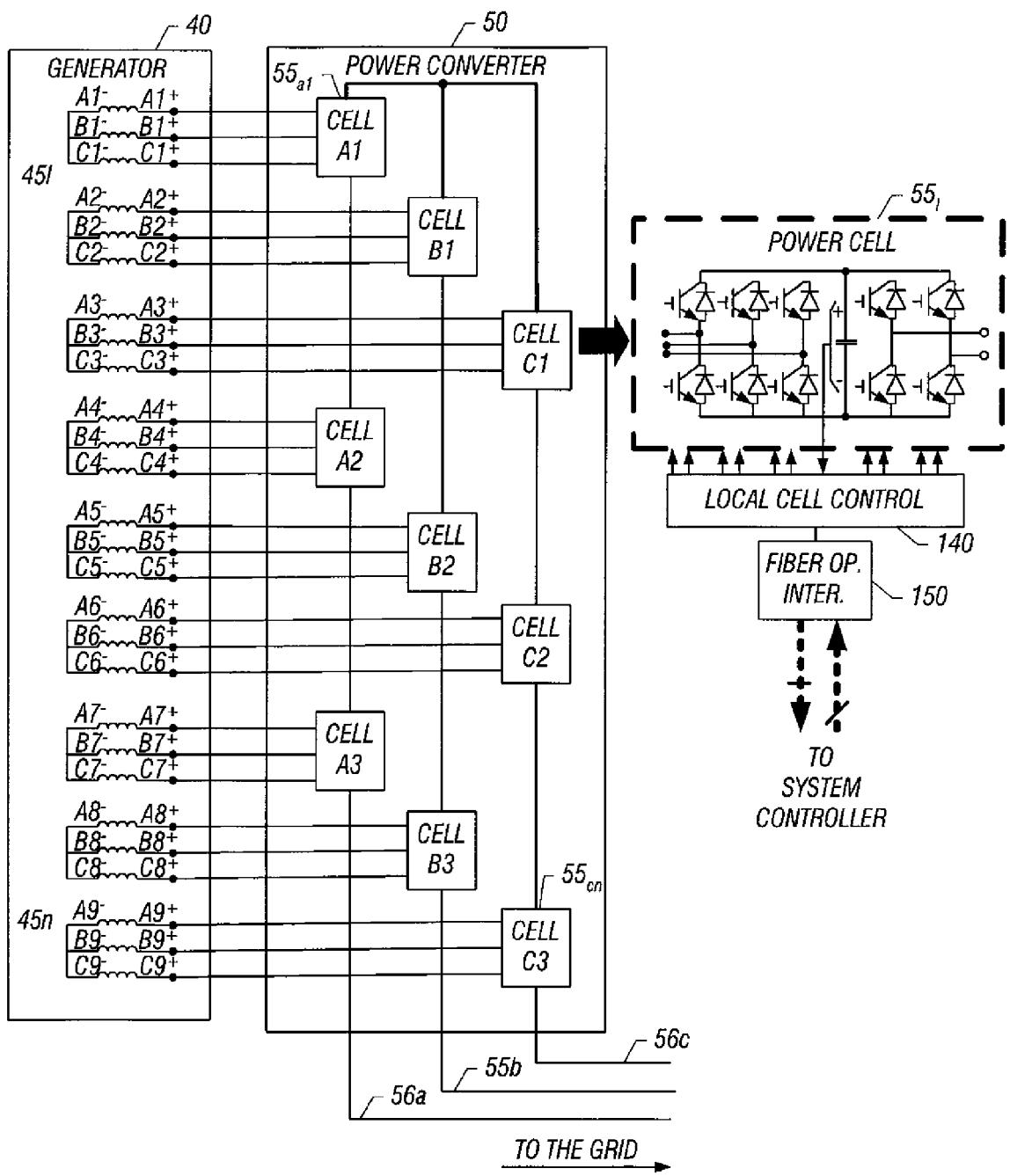
FIG. 5 is a block diagram of a wind energy conversion system in accordance with one embodiment of the present invention.

FIG. 5 shows a wind energy conversion system using the exemplary permanent magnet generator (PMG) illustrated in FIG. 4. In this configuration, nine sets ($45_1$-$45_9$) of isolated three-phase power are connected to power stages 55 of power converter 50 directly from generator 40. Note that each power stage in this embodiment includes only one power cell, however a plurality of power cells can be connected in parallel. Power stages 55 are shown with an active front-end converter configuration power cell; however, a diode front end converter or any different type of multi-level inverter can be used instead. Further shown in FIG. 5 is a connection between a local cell controller 140 that controls the switching devices of the power cell and a fiber optic interface 150 that in turn can be coupled to a system controller. Note that while not shown in FIG. 5, phase output lines 56a-56c can directly connect to a transmission grid or collector circuit.

Figure 6:
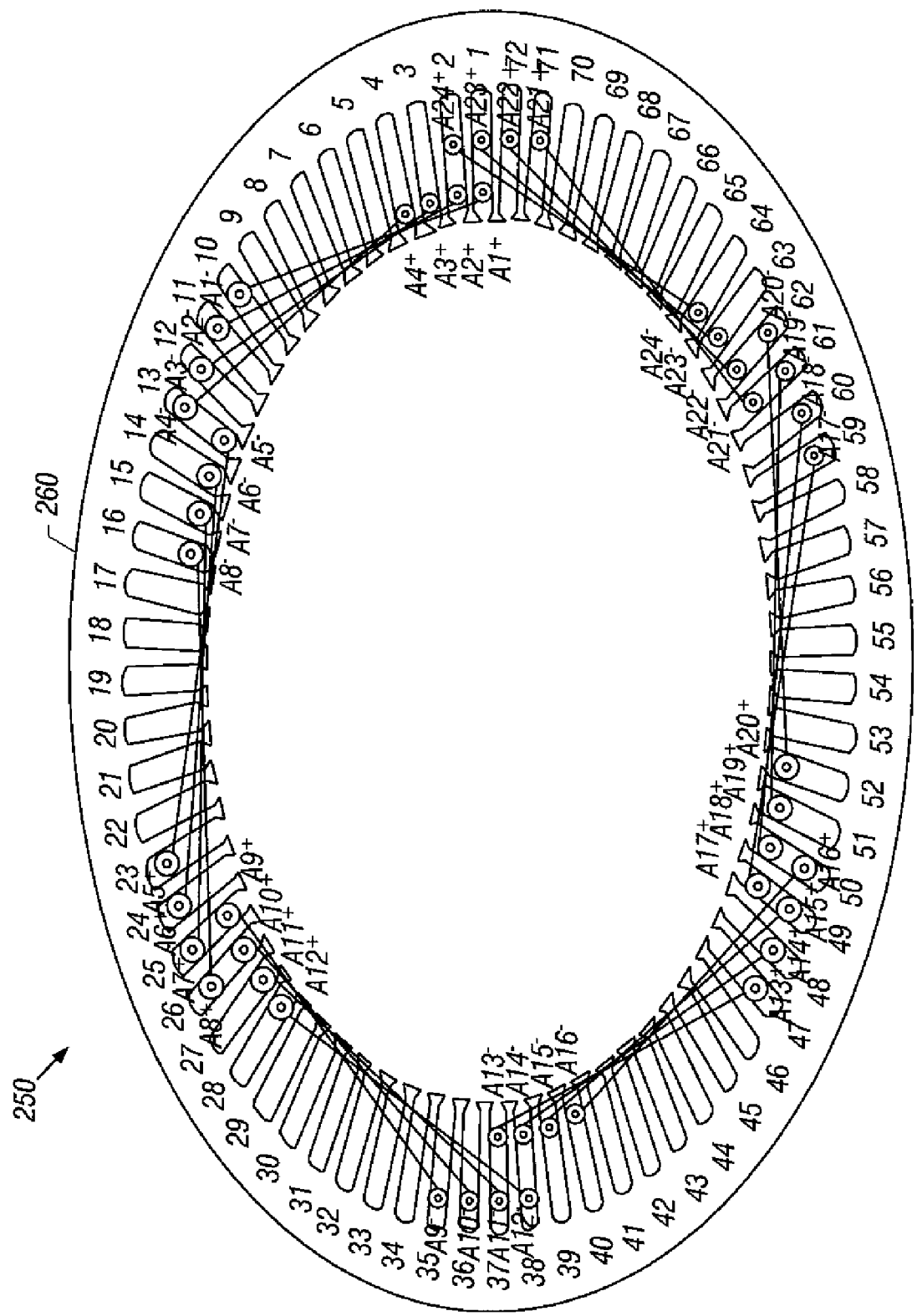
FIG. 6 is a cross-section view of an exemplary three-phase, six pole 72 slot double layer windings permanent magnet generator in accordance with one embodiment of the present invention.

FIG. 4 shows a cross-section of an exemplary three-phase PMG with 24 poles and 27 slots. FIG. 6 is a cross-section view of an exemplary three-phase, six-pole 72 slot double layer windings permanent magnet generator in accordance with one embodiment of the present invention. The winding configuration for phase A of this generator is shown in FIG. 6. In this design, there are 24 coils per phase. In the embodiment of FIG. 6, generator 250 includes a stator 260 having 72 slots, each of which may be separated into two different regions via a generally radial slot liner (not shown in FIG. 6). In some embodiments of the present invention, the generator may be of a single layer slot design, while the generators of FIGS. 4 and 6 use double layer slots. With a single layer configuration, the number of total coils will be half of the number of slots. But in a double layer configuration the total number of coils will be equal to number of slots. Note that in the embodiment shown in FIG. 6, details of the generator such as the rotor and magnets are not shown for ease of illustration.

Shown in FIG. 6 are the windings for phase A. As seen, windings may be wrapped around different slots of the generator. For example, a coil may be wrapped between slot 1 (with reference $A1^+$) and slot 11 (with reference $A1^-$). To provide a greater voltage to a power converter, embodiments may couple together multiple coils in series. In one implementation, an additional coil extending from slot 2 (i.e., $A2^+$) to slot 12 (i.e., $A2^-$) may be coupled in series to the coil extending between slots 1 and 11. In various embodiments, this series connection may be made in the generator or may be located in the power converter. Depending on where these connections are made, either 36 or 72 independent power supplies can be output from generator 250. Thus in the embodiment of FIG. 6 sets of windings are connected in series, e.g., A2 and A1 are connected in series. Such a topology increases voltage to the power stage. Thus in various implementations more than one coil can supply each phase of a power stage.

Figure 7:
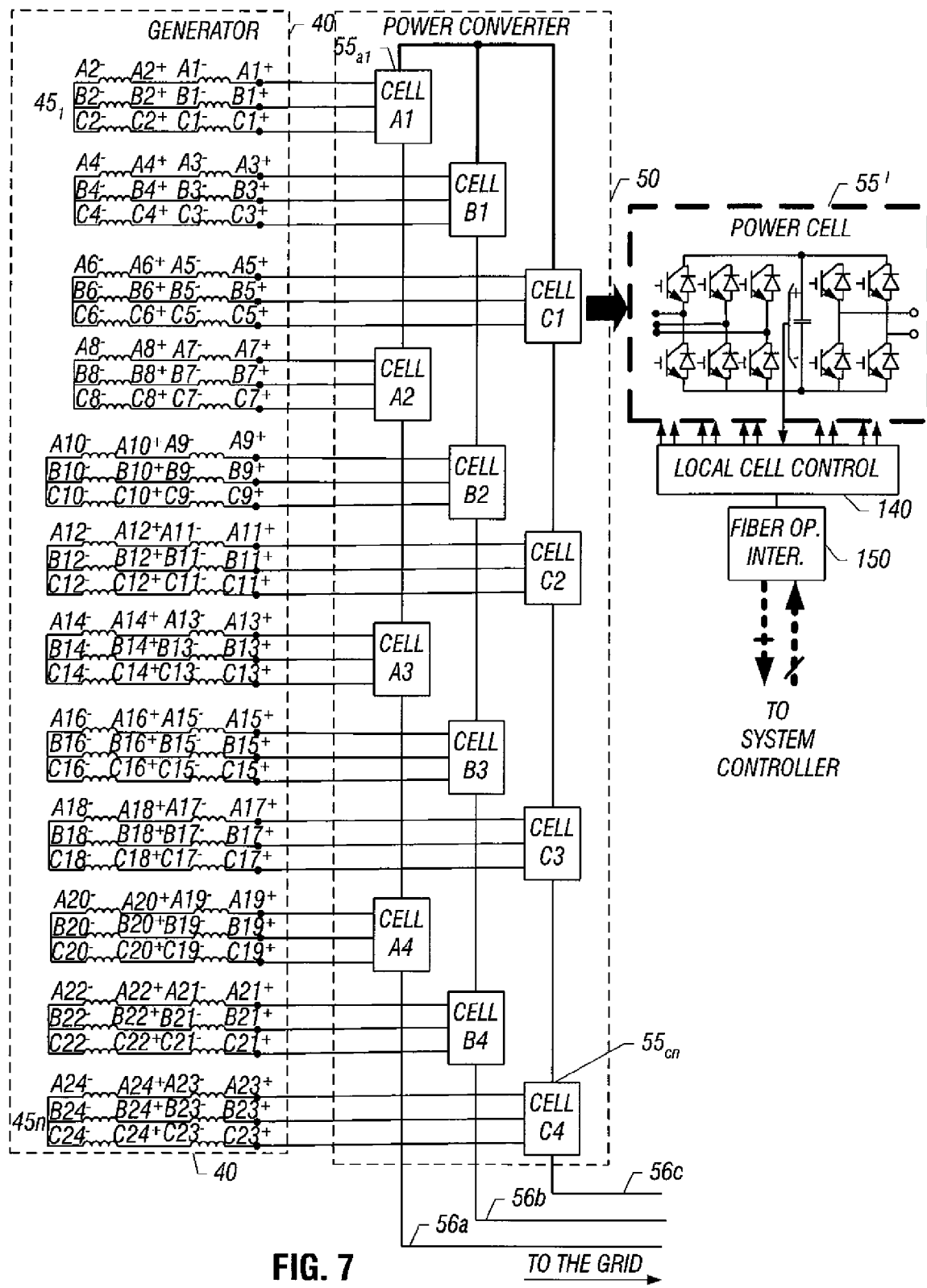
FIG. 7 is a block diagram of a wind energy conversion system in accordance with another embodiment of the present invention.

Details of a connection of these different coils in generator 250 as made to different power stages of a power converter in accordance with an embodiment of the present invention are shown in FIG. 7. In FIG. 7 each power stage includes one power cell, however several power cells can be connected in parallel to form one power stage. FIG. 7 shows a wind energy conversion system that receives power from the generator of FIG. 6. In this example, a pair of two coils is connected in series to form one phase of power supply to the power cell to allow a higher voltage supply to the power cells. Of course, more than two such coils may be coupled together. In FIG. 7, coil A1 denoted with coil ends of $A1^+$ and $A1^-$ is connected to coil A2 denoted with coil ends of $A2^+$ and A2 in series. In this configuration, twelve sets of three-phase power supplies $45_1$-$45_n$ are supplying power to the power cells. Each phase output line of the power converter can be formed by connecting in series four power stages. The frequency of the output voltage can be fixed to utility frequency, e.g., 60 Hz. The power converter is a naturally symmetrical cascaded inverter, however the isolation input transformer has been eliminated since the generator can generate the twelve isolated power supplies to the power stages or in a special case (i.e., a one cell stage) to power cells.

Figure 8:
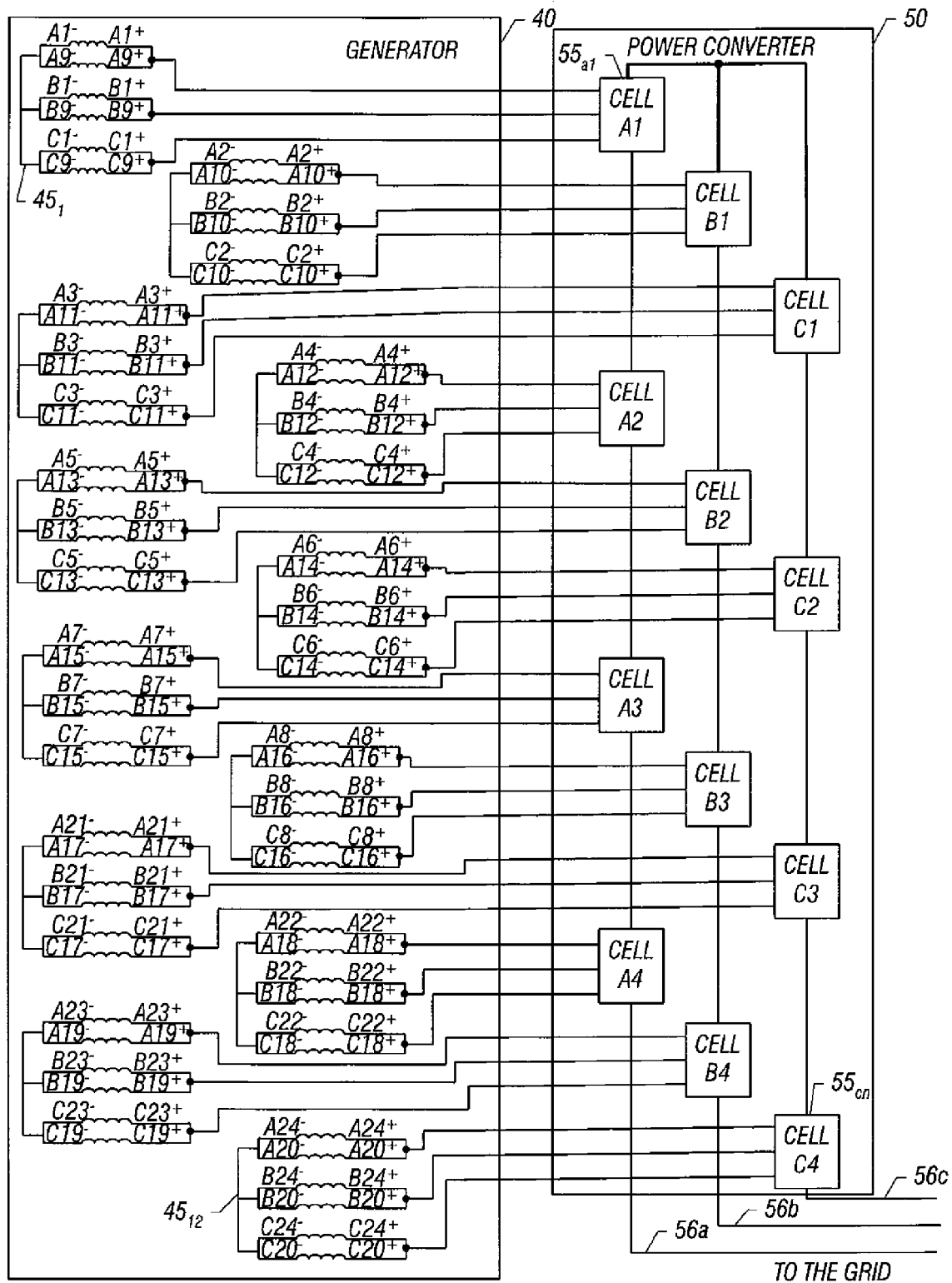
FIG. 8 is a block diagram of a parallel connection of coils in a wind conversion system in accordance with one embodiment of the present invention.

Referring now to FIG. 8, shown is a parallel connection of coils in a wind conversion system in accordance with one embodiment of the present invention. As seen, generator 40 may have sets of coils coupled together in parallel to provide single phase output power to one phase of a power stage. Thus as seen the coils may provide three-phase power supply 45 to a corresponding power stage 55 of a power converter 50. The reference numbers of the generator coils of FIG. 8 correspond to the generator configuration shown in FIG. 6. Parallel connection of coils can be used to supply more current to the power stages, while series connection of coils can be used to supply more voltage to supply power to power stages. In a parallel connection, two or more coils with the same voltage are connected in parallel.

If the shaft speed is allowed to follow variations in wind speed such that the aerodynamic efficiency characteristic of the wind turbine stays at maximum value, the turbine can be made to develop maximum power at any wind speed. An active front end power converter can control the speed of the generator based on wind speed and turbine aerodynamic efficiency characteristic to capture the maximum power of wind energy. The aerodynamic efficiency of a wind turbine is defined as wind power divided by output power of the turbine. The aerodynamic efficiency of a wind turbine is a function of pitch angle, turbine angular speed, radius of turbine blades and wind speed. The aerodynamic efficiency characteristic can be measured directly or can be calculated using software for aerodynamic designs that is usually based on blade-iteration techniques. Typically, a family of characteristics representing output power and developed torque as a function of turbine speed for a number of wind speeds can be deduced from aerodynamic efficiency versus wind speed. However, the aerodynamic efficiency of wind turbine can be maximized at different wind speed if the turbine rotates at certain speed. The speed of a turbine can be controlled to maximize the aerodynamic efficiency of wind turbine at different wind speed. Hence the maximum power of wind energy can be captured. The generator can be speed controlled to force the turbine to rotate at a corresponding speed. To be able to control the speed of generator based on wind speed an active front converter can be used. While described in connection with a permanent magnet generator, any kind of AC generator such as induction generator, synchronous generator, permanent magnet synchronous generator, or switched reluctance generator can be used. It is also possible to couple more than one generator to produce higher voltage and power by increasing the number of power stages in series that enables the wind energy conversion to be connected to distribution or transmission grid.

Figure 9:
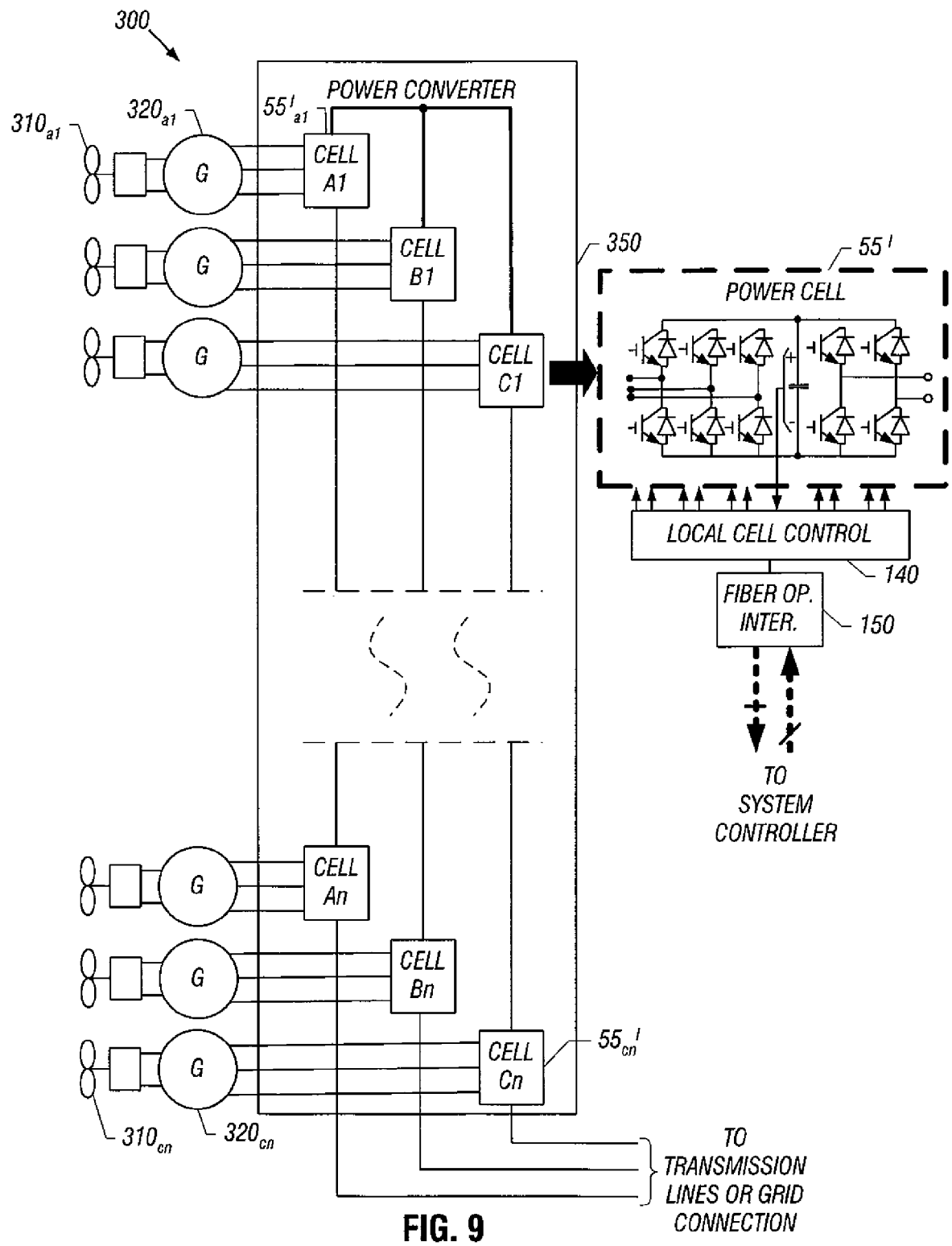
FIG. 9 is a block diagram of a wind faun power conversion system using a multi-output gearbox in accordance with one embodiment of the present invention.

FIG. 9 depicts a wind farm power conversion system 300 in accordance with another embodiment of the present invention. In this configuration, there are 3 n wind turbines $310_{a1}$-$310_{cn}$ each coupled to a three-phase generator 320. Each generator supplies power to one of a group of power stages $55'_{a1}$-$55'_{cn}$ of a power converter 350. In the embodiment of FIG. 9, each generator is directly coupled to a corresponding power stage, avoiding the need for one or more input transformers. The output voltage of generators can be lower voltage, however by cascading the power stages, higher voltage and power can be realized. The power cells of the system can be diode, active front-ends, or any other type of multi-level inverter, although a representative active front end converter is shown in FIG. 9. As with the other system configurations discussed above, the need for a step-up transformer can also be avoided.

Figure 10:
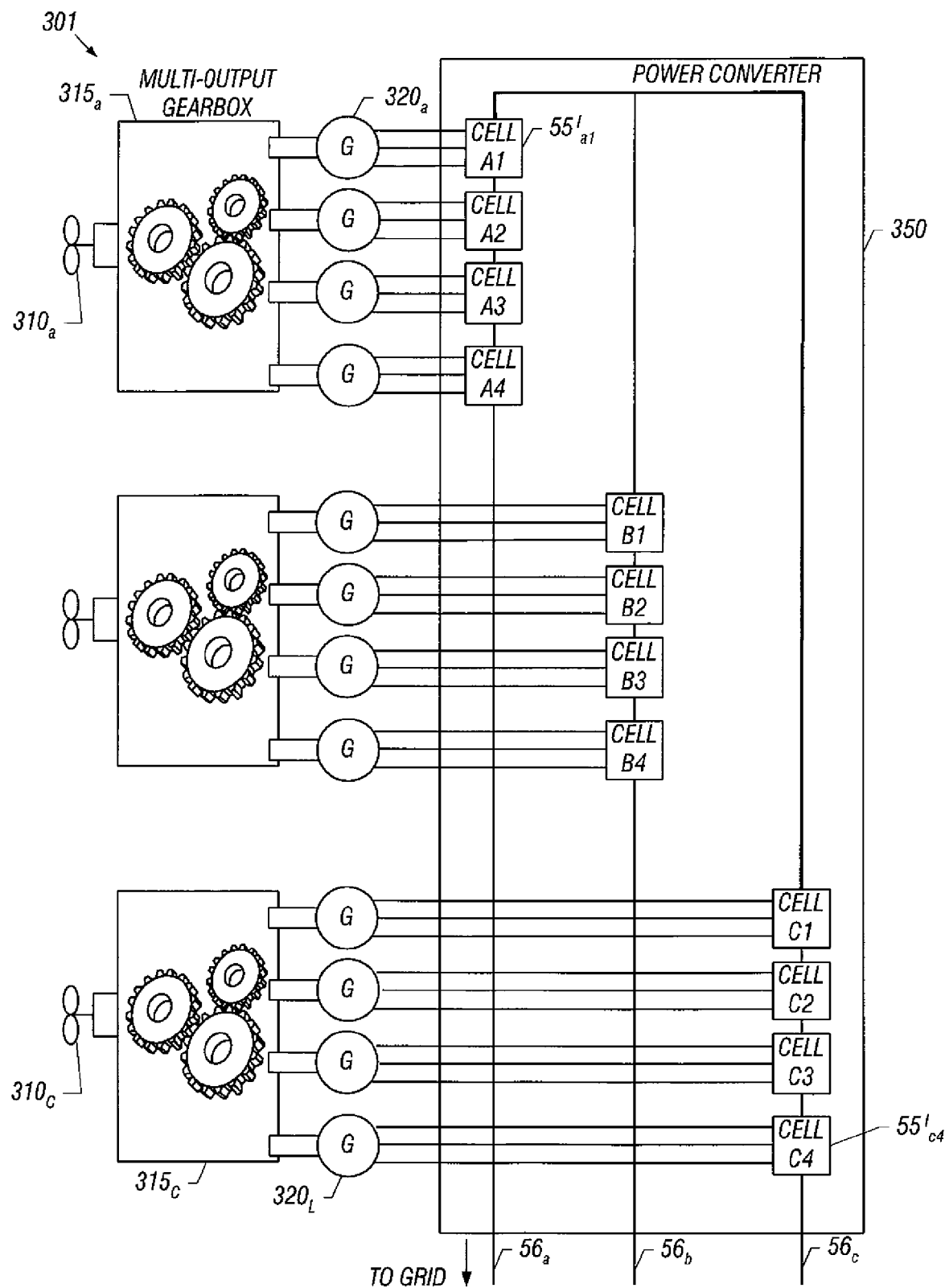
FIG. 10 is a block diagram of a wind energy conversion system with a multi-output gear box in accordance with another embodiment of the present invention.

FIG. 10 shows a wind farm power conversion system 301 using a multi-output gearbox 315. Each output of the gearbox drives a three-phase generator 320 and in turn each generator 320 supplies power to a power stage 55'. In the embodiment of FIG. 10 each power stage includes one power cell, although multiple cells can be coupled in parallel. Thus each gear box 315 is coupled to receive the output of a corresponding wind turbine via an input shaft and provides four output shafts, each to couple to a different generator. In this example four power stages are configured in a series connection to provide power along a corresponding phase output line 56.

Figure 11:
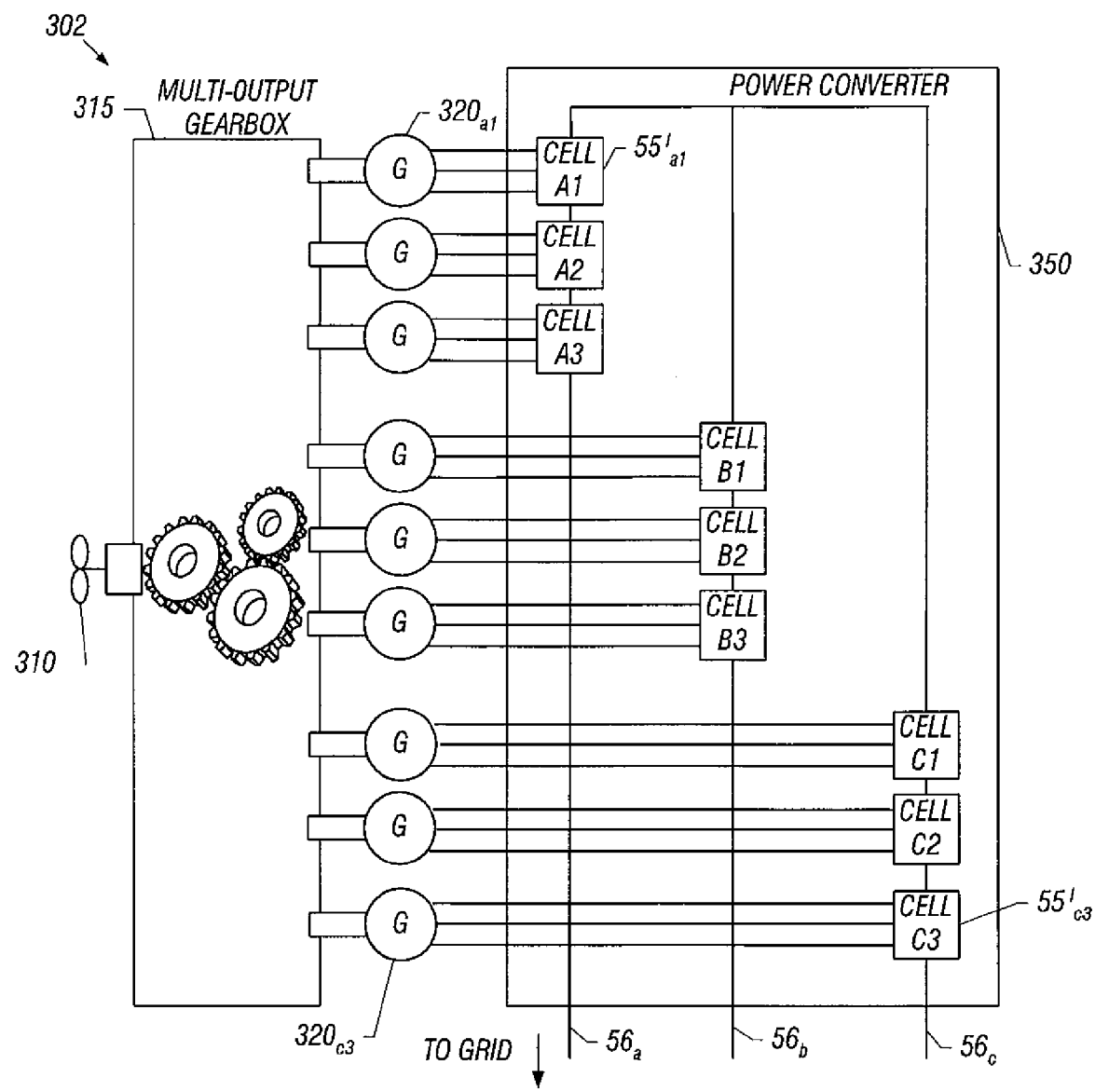
FIG. 11 is a block diagram of another embodiment of a wind energy conversion system having a multi-output gearbox in accordance with one embodiment of the present invention.

FIG. 11 shows a block diagram of another embodiment of a wind energy conversion system 302 having a multi-output gearbox 315. In this embodiment, a single turbine 310 is coupled to the gearbox, which in turn provides nine outputs to nine corresponding generators 320. In turn, each generator may provide three-phase power to a corresponding power stage 55', which may be built up of a plurality of a diode or active front end-based power cell or any different kind of multi-level inverter. The series outputs of the phase output lines 56a-56c of power converter 350 can be coupled directly to a transmission grid or a collector circuit.

Figure 12:
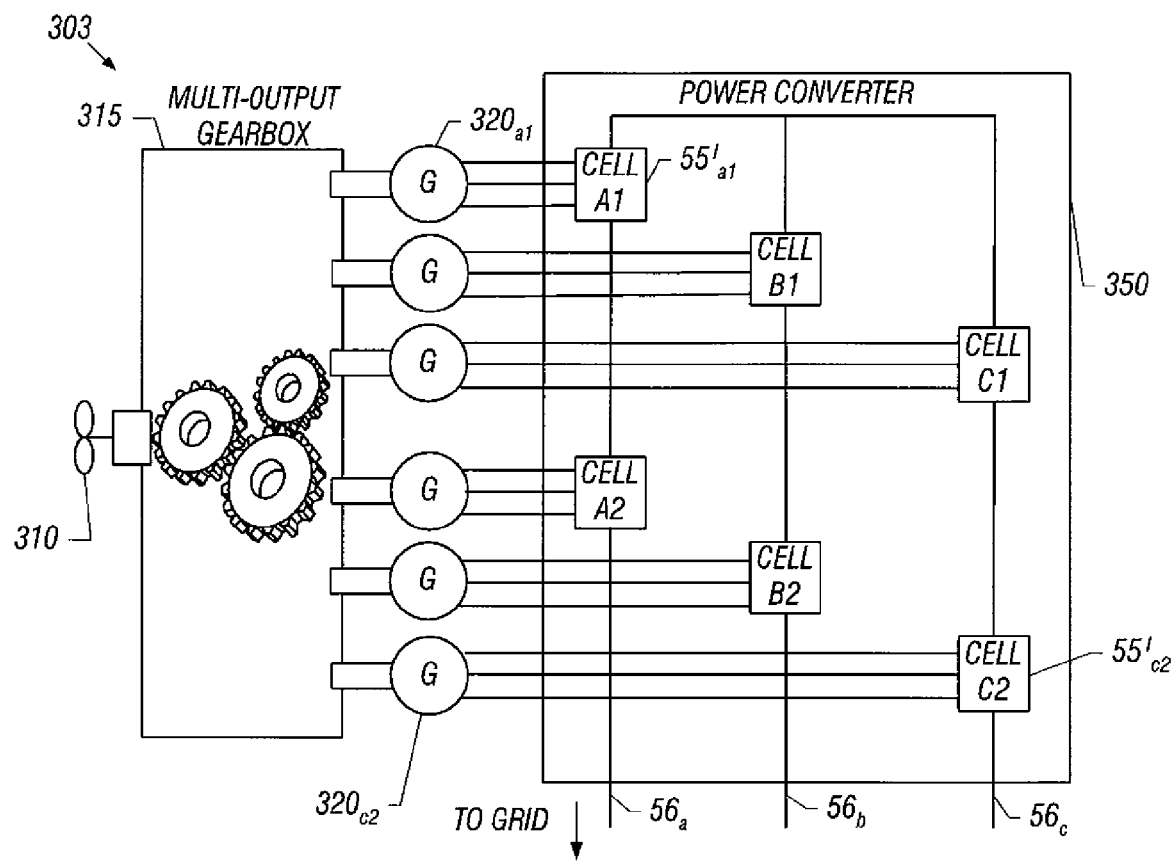
FIG. 12 is a block diagram of another embodiment of a wind energy conversion system having a multi-output gearbox in accordance with one embodiment of the present invention.

FIG. 12 shows a block diagram of another embodiment of a wind energy conversion system 303 having a multi-output gearbox 315. In this embodiment, a single turbine 310 is coupled to the gearbox, which in turn provides outputs to six corresponding generators 320. In turn, each generator may provide three-phase power to a corresponding power stage 55', each of which may include one or more diodes or active front end-based power cells coupled in parallel. The output lines 56a-56c of power converter 350 can be coupled directly to a transmission grid or a collector circuit.

Figure 13:
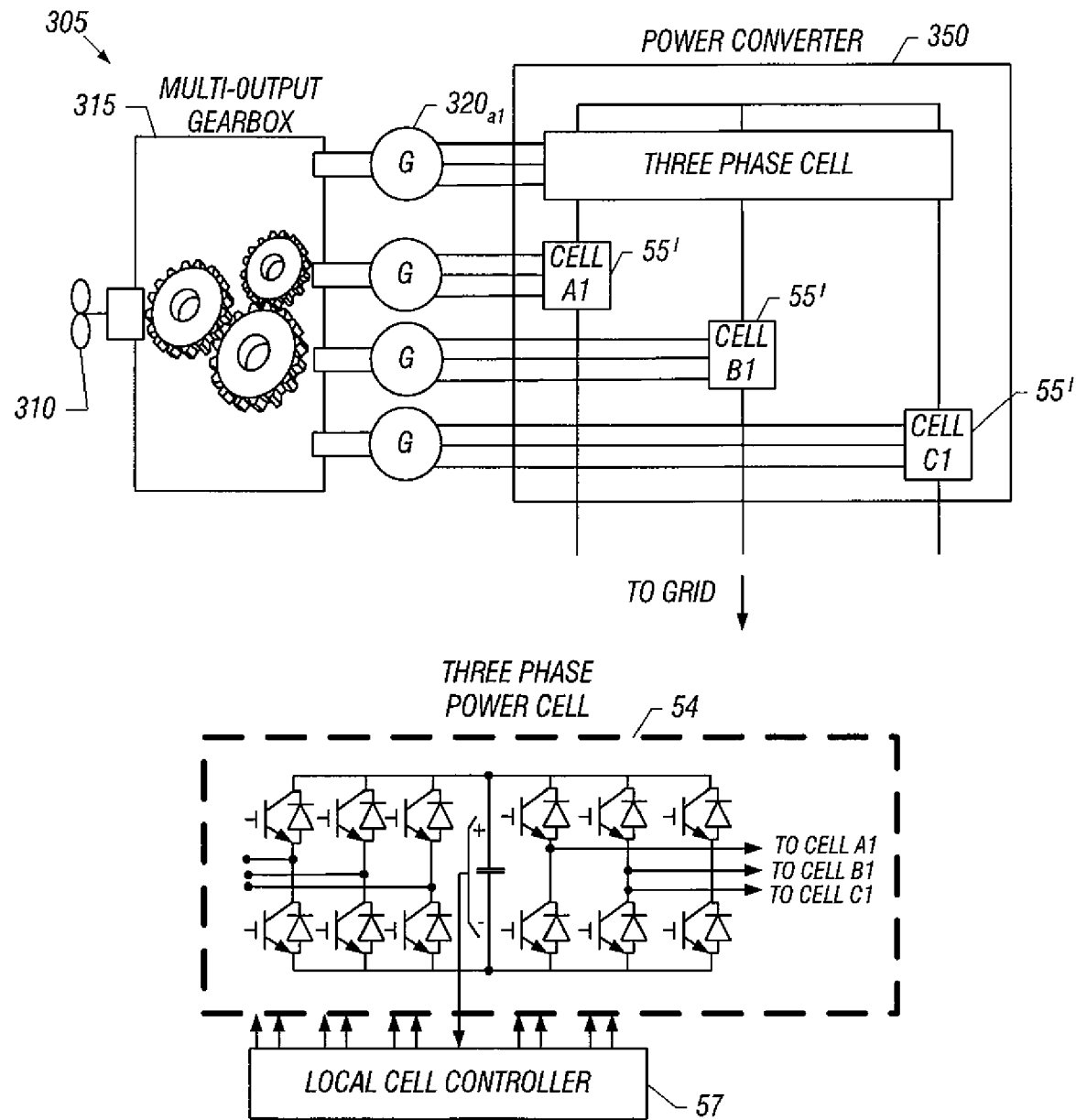
FIG. 13 is a block diagram of a wind energy conversion system in accordance with a further embodiment of the present invention.

In other implementations, a power converter can be formed using a combination of three-phase power stages and single-phase power stages. Referring now to FIG. 13, shown is a block diagram of a wind energy conversion system 305 that includes a power converter 350 having a three-phase power stage 54 and a plurality of single-phase power stages 55'. As seen, each power stage receives isolated three-phase power from a corresponding generator 320. FIG. 13 further shows a schematic diagram of a three-phase power cell 54. As seen, the H bridge configuration provides outputs at three phases, each to one of the single-phase power stages 55'. In turn, power cell 54 is coupled to a local cell controller 57.

Figure 14:
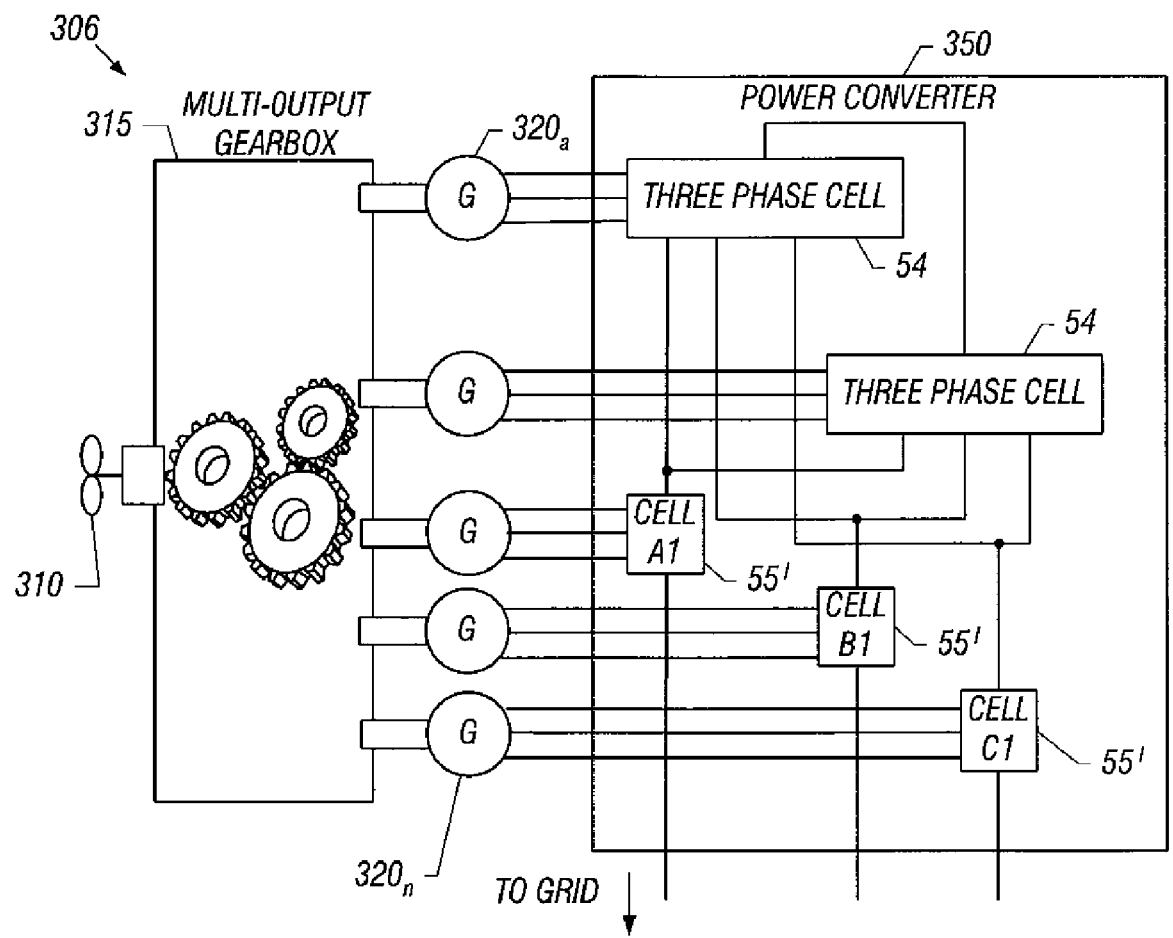
FIG. 14 is a block diagram of another embodiment of a wind energy conversion system in accordance with another embodiment of the present invention.

FIG. 14 shows another embodiment of a wind energy conversion system 306 in which a three phase power stage includes two three-phase power cells 54 in parallel, where the outputs of the three-phase stage are cascaded with single-phase power stages 55'.

Figure 15:
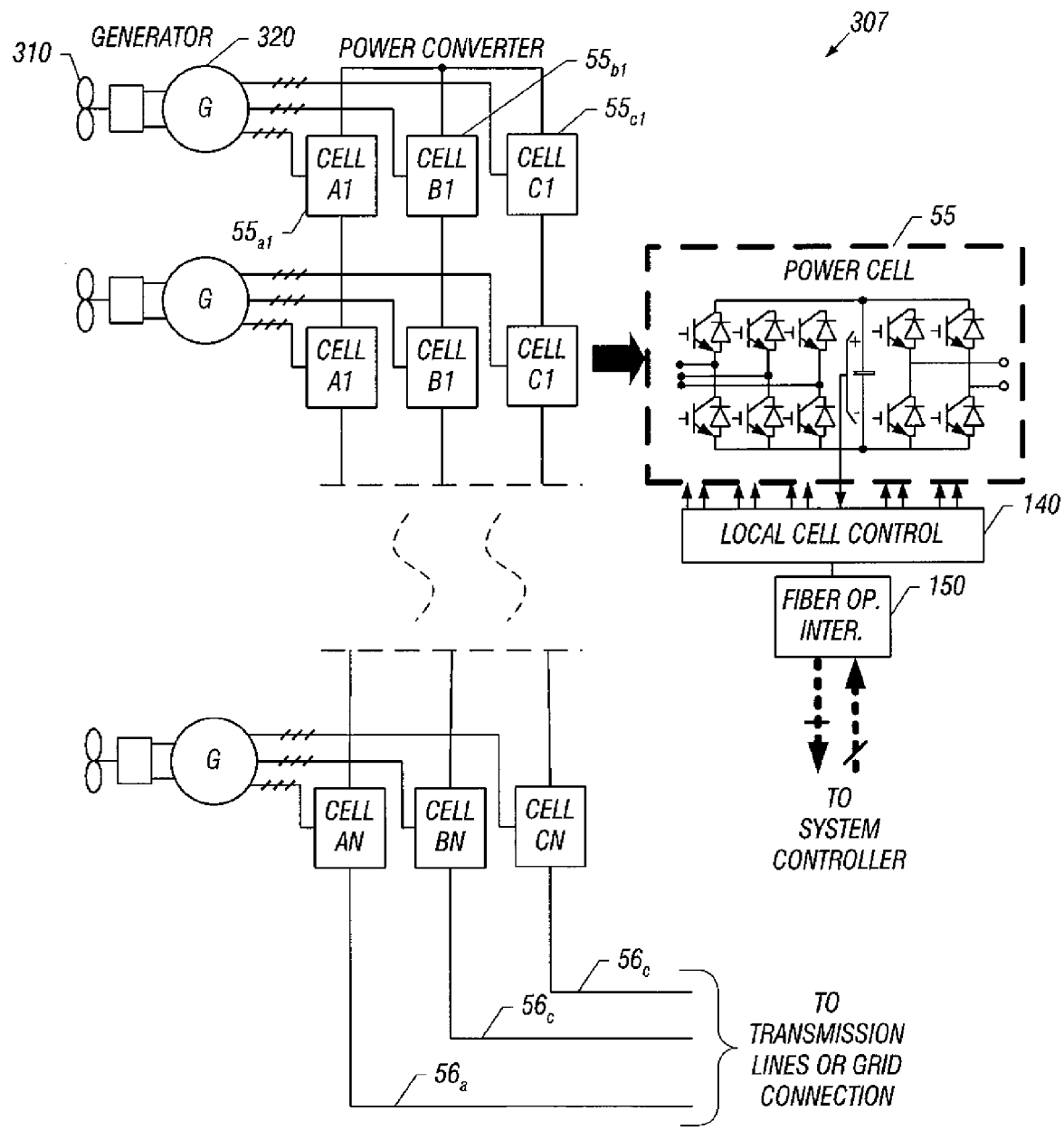
FIG. 15 is a block diagram of a wind energy conversion system in accordance with yet another embodiment of the present invention.

Referring now to FIG. 15, shown is a block diagram of a wind energy conversion system 307 in accordance with yet another embodiment of the present invention. As shown in FIG. 15, each generator 320 may provide three-phase power to a plurality of power stages. As seen in the embodiment of FIG. 15, each generator 320 provides three-phase power to three power stages 55 (e.g., cells $55_{a1}$-$55_{c1}$). The cascaded outputs from the power stages on phase output lines 56a-56c may be directly coupled to transmission lines or another grid connection. While shown with these particular implementations in the various figures described above, it is to be understood that the scope of the present invention is not limited in this regard and in different implementations many different topologies that provide direct connection from a generator to one or more power cells of a power converter and in turn from the power cells directly to a transmission grid or collector circuit can be realized.

While the present invention has been described with respect to a limited number of embodiments, those skilled in the art will appreciate numerous modifications and variations therefrom. It is intended that the appended claims cover all such modifications and variations which fall within the true spirit and scope of this present invention.

What is claimed is:
1. A system comprising:
a plurality of wind turbines each coupled to at least one generator to output mechanical energy to the at least one generator;
the plurality of generators each coupled to one of the wind turbines to receive the mechanical energy and to output a plurality of isolated supply powers; and
a power converter connected to the plurality of generators, the power converter including a plurality of power stages each to receive at least one of the isolated supply powers, wherein a first subset of the power stages are coupled to a first phase output line and a second subset of the power stages are coupled to a second phase output line.

2. The system of claim 1, wherein each of the plurality of generators includes N coils, wherein N equals P·n·(k·m), where P is the number of phase output lines, n is the number of the plurality of power stages provided isolated supply powers by the corresponding generator, k is the number of coils of the corresponding generator coupled together to form one phase of an isolated supply power, and m is the number of phases received by one of the power stages.

3. The system of claim 1, wherein each of the wind turbines is coupled to one generator.

4. The system of claim 1, further comprising a gear box coupled to an output of one of the plurality of wind turbines and having a plurality of outputs each coupled to one generator.

5. The system of claim 1, wherein the power converter includes at least one m-phase power stage and a plurality of single phase power stages, wherein the m-phase power stage has m-outputs each coupled to one of the single phase power stages.

6. The system of claim 1, wherein each of the plurality of generators provides m-phase isolated supply powers to a plurality of power stages each coupled to a different phase output line.

7. The system of claim 1, wherein the first and second phase output lines are directly coupled to a transmission grid without a step-up transformer.

8. A system comprising:
a plurality of wind turbines each coupled to at least one generator to output mechanical energy to the at least one generator;
the plurality of generators each coupled to one of the wind turbines to receive the mechanical energy and to output a plurality of isolated supply powers; and
a power converter connected to the plurality of generators, the power converter including a plurality of power stages each coupled to one of the plurality of generators to receive the plurality of isolated supply powers therefrom, wherein a first subset of the power stages are coupled to a first phase output line and a second subset of the power stages are coupled to a second phase output line.

9. The system of claim 8, wherein each of the plurality of generators includes N coils, wherein N equals P·n·(k·m), where P is the number of phase output lines, n is the number of the plurality of power stages provided isolated supply powers by the corresponding generator, k is the number of coils of the corresponding generator coupled together to form one phase of an isolated supply power, and m is the number of phases received by one of the power stages.

10. The system of claim 8, wherein each of the wind turbines is coupled to one generator.

11. The system of claim 8, further comprising a gear box coupled to an output of one of the plurality of wind turbines and having a plurality of outputs each coupled to one generator.

12. The system of claim 8, wherein the power converter includes at least one m-phase power stage and a plurality of single phase power stages, wherein the m-phase power stage has m-outputs each coupled to one of the single phase power stages.

13. The system of claim 8, wherein each of the plurality of generators provides m-phase isolated supply powers to a plurality of power stages each coupled to a different phase output line.

14. The system of claim 8, wherein the first and second phase output lines are directly coupled to a transmission grid without a step-up transformer.

15. A method comprising:
outputting mechanical energy from a plurality of wind turbines each coupled to at least one generator;
receiving the mechanical energy in each of the plurality of generators and outputting a plurality of isolated supply powers from the plurality of generators; and
receiving the plurality of the isolated supply powers in each of a plurality of power stages that form a power converter connected to the plurality of generators, wherein a first subset of the power stages are coupled to a first phase output line and a second subset of the power stages are coupled to a second phase output line.

16. The method of claim 15, wherein each of the plurality of generators includes N coils, wherein N equals P·n·(k·m), where P is the number of phase output lines, n is the number of the plurality of power stages provided isolated supply powers by the corresponding generator, k is the number of coils of the corresponding generator coupled together to form one phase of an isolated supply power, and m is the number of phases received by one of the power stages.

17. The method of claim 15, further comprising coupling each of the wind turbines to one generator.

18. The method of claim 15, further comprising coupling a gear box to an output of one of the plurality of wind turbines and having a plurality of outputs each coupled to one generator.

19. The method of claim 15, further comprising directly coupling the first and second phase output lines to a transmission grid without a step-up transformer.

* * * * *